United States Patent
Tang et al.

(10) Patent No.: US 9,640,816 B2
(45) Date of Patent: May 2, 2017

(54) FLOW BATTERY PACK WITH MONITORING SYSTEM

(75) Inventors: Hao Tang, Sichuan (CN); Guangyou Xie, Sichuan (CN); Cong Yin, Sichuan (CN); Zhankui Zhang, Sichuan (CN); Ronggui Wang, Sichuan (CN); Yong Lian, Sichuan (CN)

(73) Assignee: DONGFANG ELECTRIC CORPORATION, Chengdu, Sichuan (CN)

( * ) Notice: Subject to any disclaimer, the term of this patent is extended or adjusted under 35 U.S.C. 154(b) by 368 days.

(21) Appl. No.: 14/382,642

(22) PCT Filed: Jul. 3, 2012

(86) PCT No.: PCT/CN2012/078119
§ 371 (c)(1),
(2), (4) Date: Sep. 3, 2014

(87) PCT Pub. No.: WO2013/131343
PCT Pub. Date: Sep. 12, 2013

(65) Prior Publication Data
US 2015/0104723 A1    Apr. 16, 2015

(30) Foreign Application Priority Data
Mar. 5, 2012  (CN) .......................... 2012 1 0055264

(51) Int. Cl.
  *H01M 8/04*    (2016.01)
  *H01M 8/04313* (2016.01)
  (Continued)

(52) U.S. Cl.
CPC ..... *H01M 8/04313* (2013.01); *H01M 8/0432* (2013.01); *H01M 8/0438* (2013.01);
(Continued)

(58) Field of Classification Search
CPC ......... H01M 8/04313; H01M 8/04335; H01M 8/04343; H01M 8/20
(Continued)

(56) References Cited

U.S. PATENT DOCUMENTS

| 2003/0015437 A1 | 1/2003 | Luther et al. |
| 2004/0091758 A1* | 5/2004 | Kuriyama ........... H01M 8/0228 429/427 |

FOREIGN PATENT DOCUMENTS

| CN | 201549547 U | 8/2010 |
| CN | 201892654 U | 7/2011 |
| CN | 102306814 A | 1/2012 |

OTHER PUBLICATIONS

Int'l Search Report issued on Dec. 20, 2012 in Int'l Application No. PCT/CN2012/078119.

* cited by examiner

*Primary Examiner* — Basia Ridley
*Assistant Examiner* — James Erwin
(74) *Attorney, Agent, or Firm* — Panitch Schwarze Belisario & Nadel LLP

(57) ABSTRACT

Disclosed is a flow battery pack with a monitoring system. The flow battery pack with a monitoring system comprises a battery pack device and a monitoring device. The battery pack device comprises a pole plate, and the pole plate is provided thereon with a measuring port. The monitoring device comprises a measuring probe, and the measuring probe extends to the interior of the battery pack device and is arranged corresponding to the measuring port on the pole plate. The monitoring device is used for monitoring the flow pressure and temperature at the measuring port. According to the technical solution of the present disclosure, a monitoring device is introduced into the interior of a flow battery pack, and the real values of correlative parameters of the
(Continued)

interior of the battery pack and the distribution status thereof can be obtained through the monitoring device.

17 Claims, 11 Drawing Sheets

(51) Int. Cl.
    *H01M 8/18*         (2006.01)
    *H01M 8/0432*     (2016.01)
    *H01M 8/0438*     (2016.01)
    *H01M 8/20*         (2006.01)

(52) U.S. Cl.
    CPC .............. *H01M 8/188* (2013.01); *H01M 8/20* (2013.01); *Y02E 60/528* (2013.01)

(58) Field of Classification Search
    USPC ........................................................ 429/418
    See application file for complete search history.

FLOW BATTERY PACK WITH MONITORING SYSTEM

CROSS-REFERENCE TO RELATED APPLICATION

This application is a Section 371 of International Application No. PCT/CN2012/078119, filed Jul. 3, 2012, which was published in the Chinese language on Sep. 12, 2013, under International Publication No. WO 2013/131343A1, and the disclosure of which are both incorporated herein by reference.

TECHNICAL FIELD

The present disclosure relates to the field of flow energy-storage batteries, more particularly relating to a flow battery pack with a monitoring system.

BACKGROUND

All vanadium redox flow battery, which is called vanadium battery for short, is a kind of redox flow battery. With advantages of long service life, high efficiency energy conversion, high security, environment friendliness and so on, all vanadium redox flow battery, which can be applied to a large-scale energy-storage system supporting wind power generation and photovoltaic power generation, is one of the major choices for peak load shifting and load balancing of grids.

A vanadium battery is mainly composed of three parts: an electrode material, a battery diaphragm and an electrolyte, wherein the electrolyte, which is the core of the vanadium battery, is a vanadium polyvalent system to realize energy storage and release of the vanadium battery. The vanadium battery applies solutions of vanadium ions having different valence states as active substances of the anode and cathode respectively. The electrolyte circulates in a storage tank and a battery tank through an external driving pump, and redox reactions of the electrolyte at the anode and cathode occur on electrodes at two sides of an ion exchange membrane in the battery pack, thus completing a charging and discharging process.

The equations are as follows:

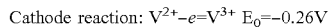

Cathode reaction: $V^{2+} - e = V^{3+}$  $E_0 = -0.26V$

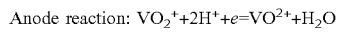

Anode reaction: $VO_2^+ + 2H^+ + e = VO^{2+} + H_2O$

In the whole all vanadium redox flow battery energy-storage system, the performance of the battery pack determines the charging and discharging performance, especially the charging and discharging power, of the whole system. The battery pack is formed by stacking and tightly pressing a plurality of individual batteries, and connecting the batteries in series, wherein FIG. 1 shows general components of an individual battery. 1' is a flow frame, 2' is a collector plate, 3' is an electrode, and 4' is a diaphragm. An individual battery 5' is composed of pole plate pieces and a battery pack 6' is formed by stacking N individual batteries 5'. In use, the values and distribution of corresponding parameters including the internal temperature, pressure, and state of charge etc. in the flow battery pack have great influence upon the performance of the battery system. In the prior art, these performance parameters are generally acquired through simulation of hydromechanics etc. or are acquired indirectly. For example, the performance parameters are monitored outside the battery. It is of great importance to acquire the real values of correlative parameters of the interior of the battery pack and distribution thereof to verify and guide operation control, system design and optimization etc. of the battery. However, there is no technology or device capable of observing correlative parameters of the interior of a battery pack in situ at present, and monitoring of battery performance parameters in different flow field designs can be hardly realized by the prior art.

SUMMARY

The present disclosure aims to provide a flow battery pack with a monitoring system so as to solve the technical problem in the prior art that it is difficult to acquire the real values of correlative parameters of the interior of the flow battery pack and the distribution thereof directly during an operation process.

To realize the purpose above, a flow battery pack with a monitoring system is provided according to an aspect of the present disclosure, including: a battery pack device, including a pole plate, and the pole plate is provided thereon with a measuring port; and a monitoring device including a measuring probe; the measuring probe extends to the interior of the battery pack device and is arranged corresponding to the measuring port on the pole plate; the monitoring device is used for monitoring the flow pressure and temperature at the measuring port.

Further, the pole plate is further provided thereon with a probe installation part; the probe installation part is connected correspondingly with the measuring port; the measuring probe is installed at the inner side of the probe installation part and the top end of the measuring probe is adapted to the measuring port.

Further, the measuring probe includes: a probe piece installed at the inner side of the probe installation part; a connecting part connected with one side of the probe piece away from the measuring port and connected with screw threads of the inner wall of the probe installation part.

Further, the pole plate is composed of a pole plate piece, wherein the pole plate piece includes: a groove pole plate piece, and the groove pole plate piece is provided thereon with a groove part, and the measuring port is provided on the bottom wall of the groove part; a lug boss pole plate piece adaptively connected with the groove pole plate piece.

Further, the groove pole plate piece includes a long straight groove pole plate piece, a right angle groove pole plate piece, a T-type groove pole plate piece, and a crossed groove pole plate piece; the lug boss pole plate piece includes a long straight lug boss pole plate piece, a right angle lug boss pole plate piece, a T-type lug boss pole plate piece and a crossed lug boss pole plate piece.

Further, the junction of neighboring pole plate pieces is provided with a sealing part.

Further, the sealing part includes: a group of sealing grooves, correspondingly provided on neighboring pole plate pieces; a sealing piece installed in the interior of the group of sealing grooves.

Further, the junction of neighboring pole plate pieces is further provided with a fixing device; the fixing device includes a locating groove and a locating pin; the locating groove and the locating pin are correspondingly provided on neighboring pole plate pieces, and provided with structures adapted to each other.

Further, the fixing device further includes a locating plate; the locating plate is provided at one side of the pole plate formed by assembling the pole plate pieces, thus fixing each pole plate piece; and the locating plate is provided thereon with a through hole corresponding to the measuring port.

Further, the locating plate is a grid mesh-shaped locating plate.

The present disclosure has the following beneficial effect: the present disclosure provides a flow battery pack with a monitoring system. By introducing a measuring probe of a monitoring device into the interior of the flow battery pack, the real values of correlative parameters of the interior of the battery pack and the distribution status thereof can be obtained directly, thereby providing a reliable basis for optimizing the performance of battery system.

BRIEF DESCRIPTION OF THE DRAWINGS

The accompanying drawings of the specification, which constitute a part of the application, are used for providing further understanding to the present disclosure. The exemplary embodiments of the present disclosure and the illustrations thereof are used for explaining the present disclosure, instead of constituting an improper limitation to the present disclosure. In the accompanying drawings:

FIG. 8b shows a structural diagram of a right angle groove pole plate piece according to an embodiment of the present disclosure;

FIG. 8c shows a structural diagram of a T-type groove pole plate piece according to an embodiment of the present disclosure;

FIG. 10a-1 shows a top structural view of a long straight groove pole plate piece provided thereon with a measuring port according to an embodiment of the present disclosure;

FIG. 10a-2 shows a front structural view of FIG. 10a-1;

FIG. 10b-1 shows a top structural view of a long straight groove pole plate piece provided thereon with three measuring ports according to an embodiment of the present disclosure;

FIG. 10b-2 shows a front structural view of FIG. 10b-1;

FIG. 10c-1 shows a top structural view of a right angle groove pole plate piece provided thereon with a measuring port according to an embodiment of the present disclosure;

FIG. 10c-2 shows a front structural view of FIG. 10c-1;

FIG. 10d-1 shows a top structural view of a right angle groove pole plate piece provided thereon with three measuring ports according to an embodiment of the present disclosure;

FIG. 10d-2 is a front structural view of FIG. 10d-1;

FIG. 10e-1 shows a top structural view of a right angle groove pole plate piece provided thereon with two measuring ports according to an embodiment of the present disclosure;

FIG. 10e-2 is a front structural view of FIG. 10e-1;

FIG. 10f-1 shows a top structural view of a T-type groove pole plate piece provided thereon with a measuring port according to an embodiment of the present disclosure;

FIG. 10f-2 is a front structural view of FIG. 10f-1;

FIG. 10g-1 shows a top structural view of a T-type groove pole plate piece provided thereon with four measuring ports according to an embodiment of the present disclosure;

FIG. 10g-2 shows a front structural view of FIG. 10g-1;

FIG. 10h-1 shows a top structural view of a T-type groove pole plate piece provided thereon with three measuring ports according to an embodiment of the present disclosure;

FIG. 10h-2 is a front structural view of FIG. 10h-1;

FIG. 10i-1 shows a top structural view of a crossed groove pole plate piece provided thereon with a measuring port according to an embodiment of the present disclosure;

FIG. 10i-2 is a front structural view of FIG. 10i-1;

FIG. 10j-1 shows a top structural view of a crossed groove pole plate piece provided thereon with five measuring ports according to an embodiment of the present disclosure;

FIG. 10j-2 is a front structural view of FIG. 10j-1;

FIG. 10k-1 shows a top structural view of a crossed groove pole plate piece provided thereon with four measuring ports according to an embodiment of the present disclosure;

FIG. 10k-2 is a front structural view of FIG. 10k-1;

DETAILED DESCRIPTION OF THE EMBODIMENTS

It should be noted that, if there is no conflict, the embodiments of the application and the characteristics in the embodiments can be combined with one another. The present disclosure will be described in details below with reference to the accompanying drawings and in combination with the embodiments.

According to a typical embodiment of the present disclosure, a flow battery pack with a monitoring system is provided, including: a battery pack device and a monitoring device. As shown in FIGS. 2 to 6, wherein the battery pack device includes a pole plate 2, and the pole plate 2 is provided thereon with a measuring port 20; and the monitoring device includes a measuring probe 23; the measuring probe 23 extends to the interior of the battery pack device and is arranged corresponding to the measuring port 20 on the pole plate 2; the monitoring device is used for monitoring the flow pressure and temperature at the measuring port 20. The pole plate in the present disclosure is a collector plate in the prior art. The present disclosure introduces the monitoring device into the interior of the flow battery pack. The monitoring device can acquire the real values of correlative parameters of the interior of the flow battery pack and the distribution status thereof directly during an operation process, which is of great importance for verifying and guiding operation control, structural and system design and optimization of the flow battery.

Figure 4:
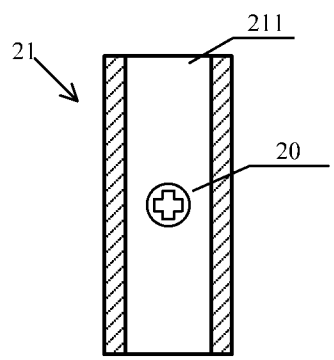
FIG. 4 shows a structural diagram of a long straight groove pole plate piece provided with a measuring port according to a typical embodiment of the present disclosure.
Figure 5:
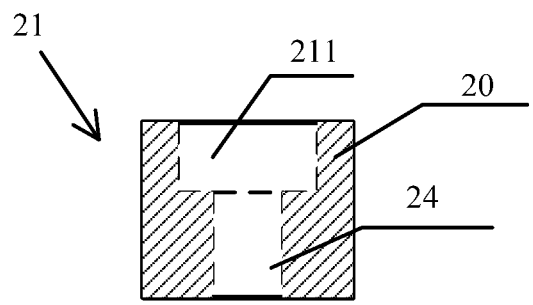
FIG. 5 is a corresponding sectional view of FIG. 4.
Figure 6:
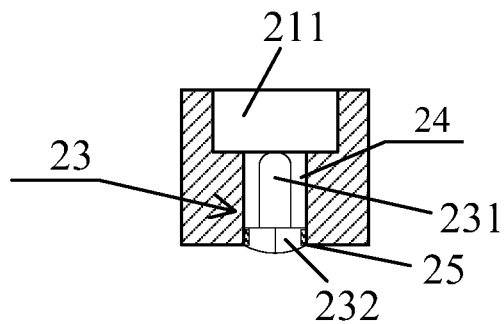
FIG. 6 is a corresponding end view of FIG. 4 and shows a structural diagram of the position of a measuring probe in a probe installation part.

According to a preferred embodiment of the present disclosure, the pole plate 2 is further provided thereon with a probe installation part 24; the probe installation part 24 is connected correspondingly with the measuring port 20; the measuring probe 23 is installed at the inner side of the probe installation part 24 and the top end of the measuring probe 23 is adapted to the measuring port 20. A probe installation part 24 installed on the bottom wall of a groove 211 of a groove pole plate piece 21 will be described now. As shown in FIGS. 4 to 6, FIG. 6 shows a structural diagram of the position of a measuring probe 23 in a probe installation part 24. Being a sensitive device which is damaged easily, the measuring probe 23 is placed in the probe installation part 24, thus ensuring use security without affecting the function.

As shown in FIG. 6, the measuring probe 23 includes a probe piece 231 and a connecting part 232; the probe piece 231 is installed at the inner side of the probe installation part 24; the connecting part 232 is connected with one side of the probe piece 231 away from the measuring port 20 and connected with screw threads 25 of the inner wall of the probe installation part 24. To avoid influence caused by introduction of a measuring device on operation conditions, the probe piece 231 of the measuring probe 23 is preferably located in the interior of the probe installation part 24 at a position where the top end just does not extend into the interior of the battery, i.e. the probe piece is leveled with the measuring port 20. The connecting part 232 is connected with the screw threads 25 of the inner wall of the probe installation part 24. The screw threads 25 of the inner wall have the functions of fixing the measuring probe and preventing liquid leakage.

Figure 1:
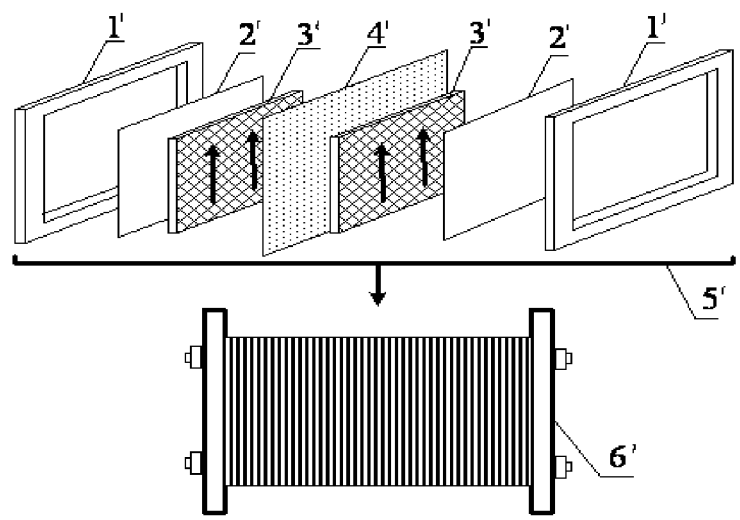
FIG. 1 shows a structural diagram of an all vanadium redox flow battery and a battery pack formed thereby in the prior art.
Figure 2:
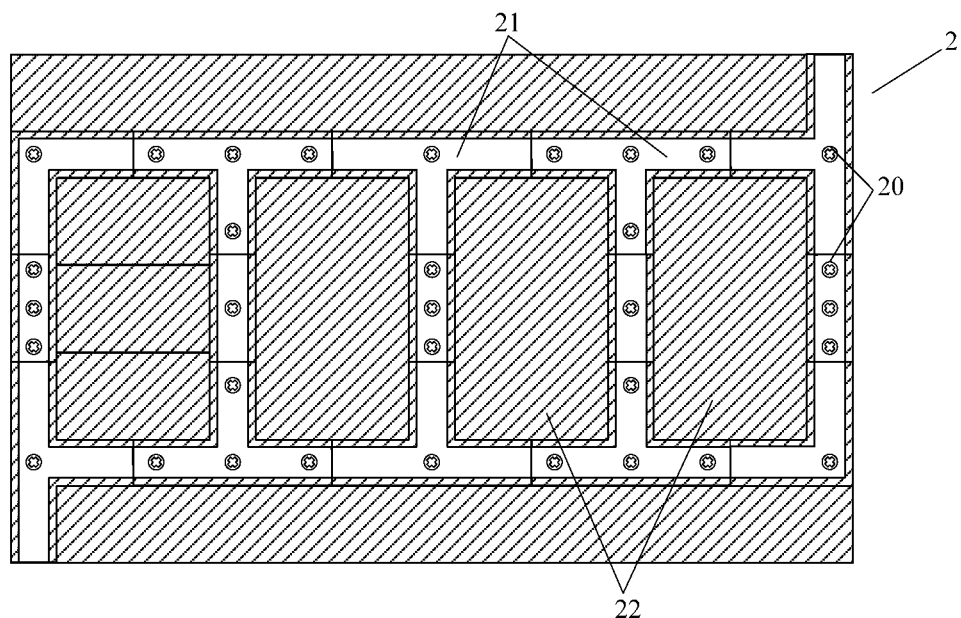
FIG. 2 shows a structural diagram of a pole plate provided with a measuring port according to a typical embodiment of the present disclosure.
Figure 3:
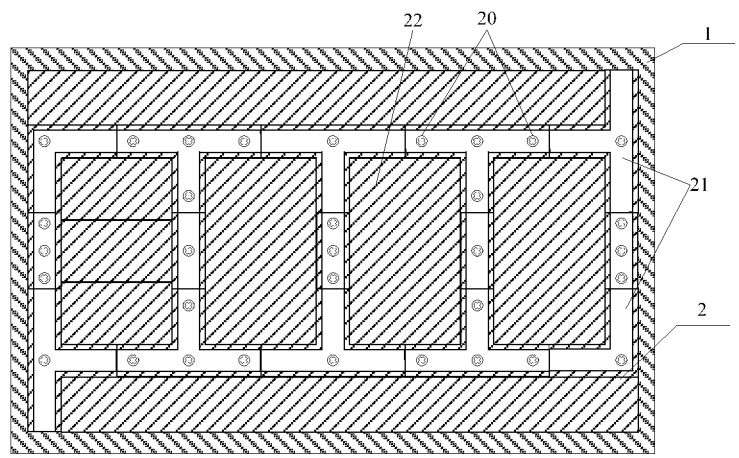
FIG. 3 shows a structural diagram of pole plate provided with a measuring port and assembled with a flow frame according to a typical embodiment of the present disclosure.
Figure 7:
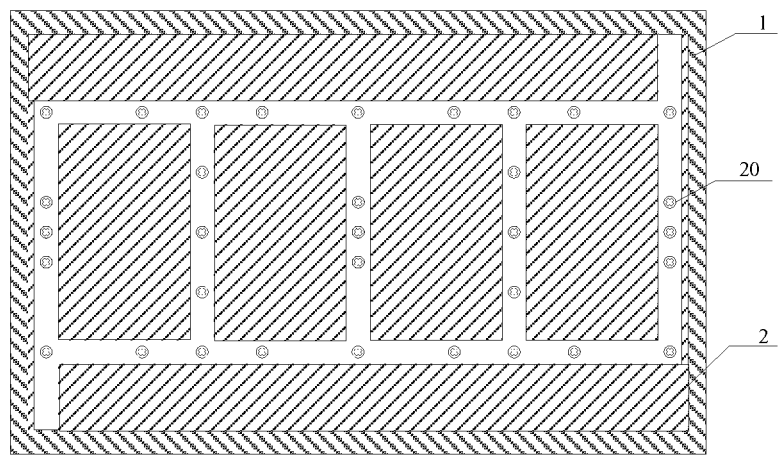
FIG. 7 shows a structural diagram of an integrated pole plate provided thereon with a measuring port according to an embodiment of the present disclosure.
Figure 8A:
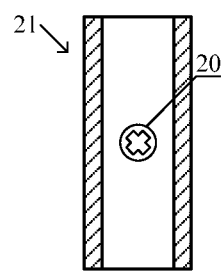
FIG. 8a shows a structural diagram of a long straight groove pole plate piece according to an embodiment of the present disclosure.
Figure 8D:
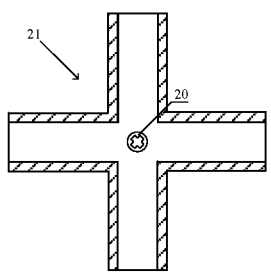
FIG. 8d shows a structural diagram of a crossed groove pole plate piece according to an embodiment of the present disclosure.
Figure 9A:
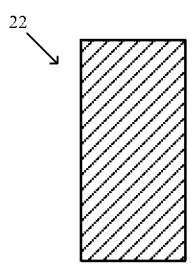
FIG. 9a shows a structural diagram of a long straight lug boss pole plate piece according to an embodiment of the present disclosure.
Figure 9B:
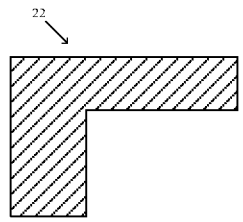
FIG. 9b shows a structural diagram of a right angle lug boss pole plate piece according to an embodiment of the present disclosure.
Figure 9C:
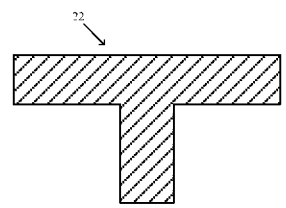
FIG. 9c shows a structural diagram of a T-type lug boss pole plate piece according to an embodiment of the present disclosure.
Figure 9D:
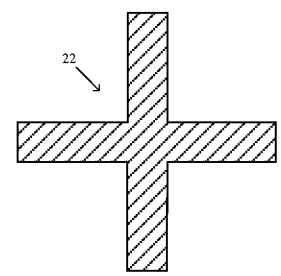
FIG. 9d shows a structural diagram of a crossed lug boss pole plate piece according to an embodiment of the present disclosure.
Figures 1, 10A:
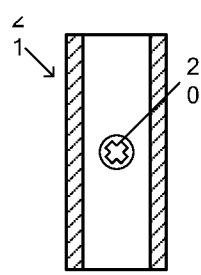
Figures 2, 10A:
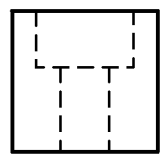
Figures 1, 10B:
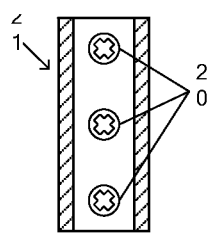
Figures 2, 10B:
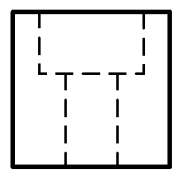
Figures 1, 10C:
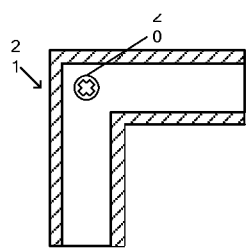
Figures 2, 10C:
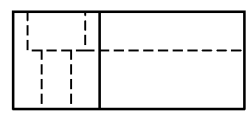
Figures 1, 10D:
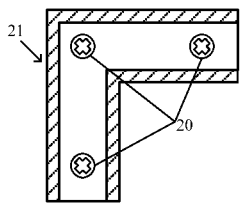
Figures 2, 10D:
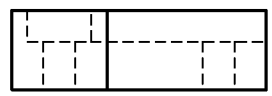
Figures 1, 10E:
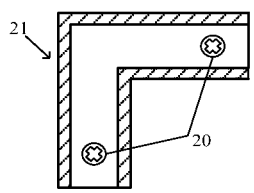
Figures 2, 10E:
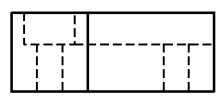
Figures 1, 10F:
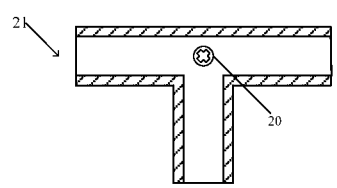
Figures 2, 10F:
Figures 1, 10G:
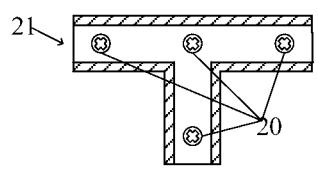
Figures 2, 10G:
Figures 1, 10H:
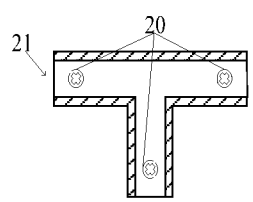
Figures 2, 10H:
Figures 1, 10I:
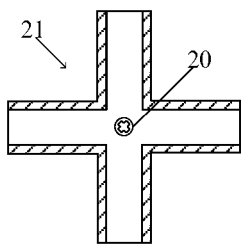
Figures 2, 10I:
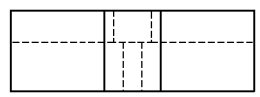
Figures 1, 10J:
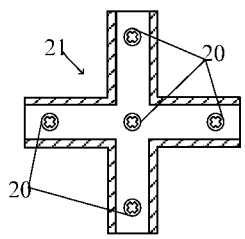
Figures 2, 10J:
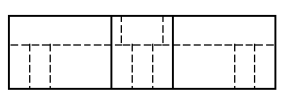
Figures 1, 10K:
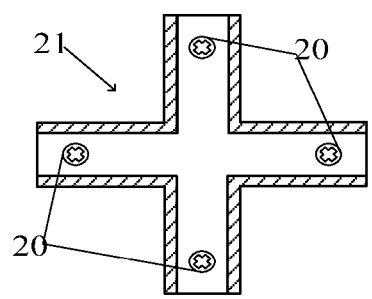
Figures 2, 10K:
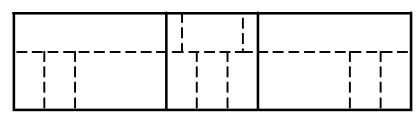

The pole plate 2 of the flow battery pack of the present disclosure includes both an integrated pole plate, as shown in FIG. 7, and a combined pole plate, as long as the pole plate 2 is provided thereon with a measuring port 20 and a monitoring device can be introduced. Preferably, the pole plate 2 is a combined pole plate. The pole plate 2 is composed of pole plate pieces, wherein the pole plate pieces include: a groove pole plate piece 21 and a lug boss pole plate piece 22, wherein the groove pole plate piece 21 is provided thereon with a groove part 211, and the measuring port 20 is provided on the bottom wall of the groove part 211; the lug boss pole plate piece 22 is adaptively connected with the groove pole plate piece 21. As shown in FIGS. 2 to 3, respectively illustrated are a structural diagram of a combined pole plate combined by a groove pole plate piece 21 and a lug boss pole plate piece 22, and a structural diagram of the combined pole plate assembled with a flow frame 1. The measuring port 20 may be provided at any position of the pole plate 2, as long as the measuring probe 23 can be installed to monitor correlative performance parameters of the interior of the flow battery pack. For example, the measuring port may be provided on the groove pole plate piece 21 or the lug boss pole plate piece 22. The measuring port 20 can be provided on the lug boss pole plate piece 22 to measure correlative parameter status of an electrode part in contact with the pole plate 2. Preferably, the measuring port 20 is provided on the bottom wall of the groove 211, thus accurately measuring the pressure of an electrolyte flowing through the groove 211. The pressure value is the pressure of the contact portion of the top of the groove 211 and an electrode.

The present disclosure preferably applies, but is not limited to the two pole plate pieces above, as long as a pole plate can be obtained through matching pole plate pieces. Groove pole plate pieces 21 and lug boss pole plate pieces 22 are combined to obtain pole plates 2 of different models, and the pole plates are matched with flow frames 1 of corresponding models to further assemble flow battery devices for different flow field designs. During investigation of parallel flow field designs of different parameters, by adjusting the proportions of the groove pole plate pieces 21 and the lug boss pole plate pieces 22, pole plates with different ratios of flow channel width to flow channel distance can be obtained without changing flow channel depth. The flow channel depth, flow channel width and flow channel distance described herein are parameters representing different flow field designs of the pole plates 2. The pole plate 2 is installed in the battery to be run and tested to obtain comparison results of response performance of different flow field designs, thus more comprehensively monitoring performance parameters and distribution status of the interiors of flow batteries of different flow field designs.

According to a preferred embodiment of the present disclosure, as shown in FIGS. 8a to 8d, the groove pole plate piece 21 includes a long straight groove pole plate piece, a right angle groove pole plate piece, a T-type groove pole plate piece, and a crossed groove pole plate piece; as shown in FIGS. 9a to 9d, the lug boss pole plate piece 22 includes a long straight lug boss pole plate piece, a right angle lug boss pole plate piece, a T-type lug boss pole plate piece and a crossed lug boss pole plate piece. The present disclosure preferably applies, but is not limited to the pole plate pieces of the above types. By designing different types of pole plates, flow battery packs of different flow field designs can be obtained, thus it is unnecessary to prepare and process each design type of pole plate, saving a great deal of time and funds for the research and development of flow battery performance.

The measuring port 20 may be provided on the pole plate pieces above and is numbered at least one. Taking a groove pole plate piece 21 for example, as shown in FIG. 10, measuring ports 20 may be provided at the following positions: in the middle of the long straight groove pole plate piece or aligned in turn; at the right angles of the right angle groove pole plate piece, the ends points of two right angle sides, or provided at the right angles and the end points of the right angle sides at the same time; the middle of the T-type groove pole plate piece, respectively provided at three end points, or provided in the middle and at the three end points at the same time; in the middle of the crossed groove pole plate piece, at four end points, or provided in the middle and the four end points at the same time; the measuring ports 20 are uniformly provided at the positions above, thus more accurately the real values of performance parameters of the interior of the flow battery pack can be obtained.

Figure 11:
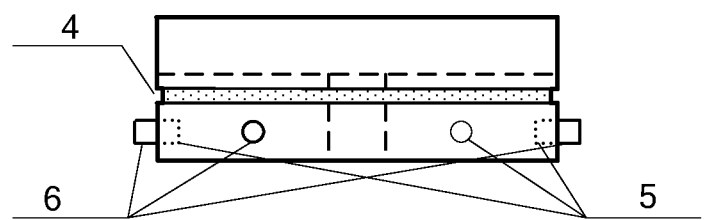
FIG. 11 shows a front structural view of a groove pole plate piece provided with a sealing groove according to an embodiment of the present disclosure.

According to a preferred embodiment of the present disclosure, the junction of neighboring pole plate pieces is provided with a sealing part. After pole plates 2 of different sizes are assembled by groove pole plate pieces 21 and lug boss pole plate pieces 22, gaps may exist at the junctions among the pole plate pieces. Because of these gaps, the interior of the assembled flow battery pack is not completely isolated from the exterior, thus resulting in liquid leakage. Therefore, sealing parts need to be provided at the junctions of the pole plate pieces. There are various structures of sealing parts. Preferably, as shown in FIG. 11, the sealing part includes: a group of sealing grooves 4 and a sealing piece. The sealing grooves 4 are correspondingly provided on neighboring pole plate pieces; and the sealing piece installed in the interior of the group of sealing grooves 4 which are provided correspondingly. When the sealing grooves 4 are provided on the groove pole plate pieces 21, they need to be provided at positions lower than the groove part 211 in the groove pole plate pieces 21. The outer wall surface corresponding to the groove part 211 is relatively thin and the groove pole plate pieces 21 may be deformed if the sealing grooves 4 are further provided, which is unfavourable for assembly of the pole plates 2 and use thereof after the assembly, thus the positions of the sealing grooves 4 are preferably lower than those of the groove part 211. When the sealing grooves are provided on the lug boss pole plate pieces 22, the positions of the sealing grooves 4 are not limited, but need to be adapted with sealing grooves 4 on pole plate pieces connected with the sealing grooves. The sealing parts described here are preferably sealing rings. The sealing grooves 4 and sealing rings are provided to ensure excellent sealing effect of a combined pole plate.

Figure 12:
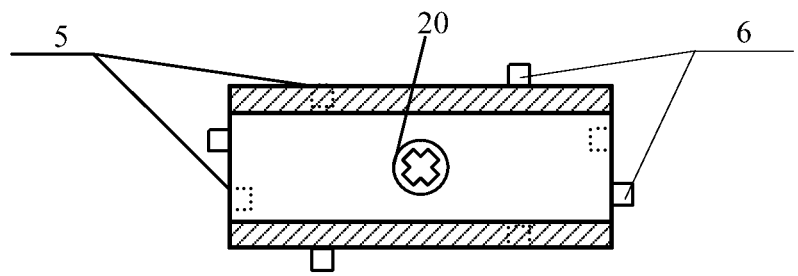
FIG. 12 shows a structural diagram of a groove pole plate piece provided with a locating groove and a locating pin according to an embodiment of the present disclosure.

According to another typical embodiment of the present disclosure, besides the sealing parts, the flow battery pack is further provided with a fixing device at the junction of neighboring pole plate pieces. The fixing device includes a locating groove 5 and a locating pin 6; the locating groove 5 and the locating pin 6 are correspondingly provided on neighboring pole plate pieces, and provided with structures adapted to each other. As shown in FIGS. 11 to 12, locating grooves 5 and locating pins 6 are uniformly provided below the sealing grooves 4, thus facilitating locating during an assembly process. Opposite surfaces of neighboring pole plates are respectively provided with a locating groove 5 and a locating pin 6. Preferably, a locating groove 5 and a locating pin 6 are provided on each connected surface, thus opposite locating grooves 5 and locating pins 6 are used in a matched manner so that the assembled pole plate 2 is firmer and more durable to facilitate future assembly of the flow battery.

According to a preferred embodiment of the present disclosure, the fixing device further includes a locating plate; the locating plate is provided at one side of the pole plate 2 formed by assembling the pole plate pieces, thus fixing each pole plate piece; and the locating plate is provided thereon with a through hole corresponding to the measuring port 20. The locating plate can prevent the assembled pole plate 2 from being deformed. The through hole corresponding with the measuring port 20 is provided on the locating plate without affecting the insertion of the measuring probe 23, thus facilitating assembly. Preferably, the locating plate can apply a material having good electrical conductivity, e.g. copper, stainless steel etc., thus excellent electrical conductivity can be realized between pole plates of neighboring anodes and cathodes after different pole plates 2 are assembled into a battery, so that the measured correlative parameters can be closer to actual operation conditions of the battery. The electrical conductivity of such a conductive locating plate may be further adjusted by means including changing materials and increasing the thickness of the locating plate etc. Thus, the relation between the electrical conductivity of a pole plate and operation parameters of a battery pack can be inspected conveniently without changing the material of the pole plate.

Figure 13:
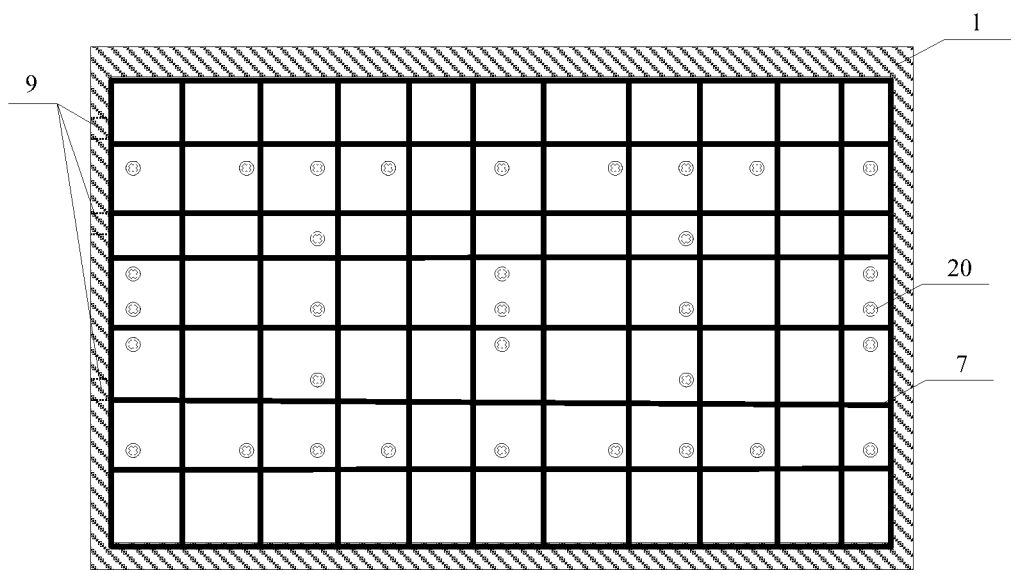
FIG. 13 shows a structural diagram of a combined pole plate with a grid mesh-shaped back plate according to an embodiment of the present disclosure.
Figure 14:
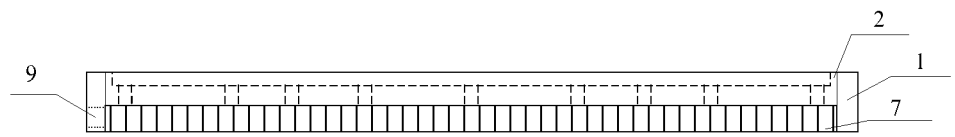
FIG. 14 shows an end structural view of a combined pole plate with a grid mesh-shaped back plate according to an embodiment of the present disclosure.

Preferably, the locating plate is a grid mesh-shaped locating plate 7. As shown in FIGS. 13 to 14, FIG. 13 shows a structural diagram of a combined pole plate 2 provided with a grid mesh-shaped locating plate 7, and FIG. 14 is an end structural view of FIG. 13. The locating plate and the combined pole plate 2 are assembled together in the flow frame 1. A guiding port 9 for guiding a conductor of the measuring probe 23 out of the battery is reserved on the flow frame 1. The present disclosure preferably applies, but is not limited to the structure, as long as the locating plate can fix the combined pole plate without affecting the insertion of the measuring probe. For example, the locating plate may be provided in parallel at the outer side of the flow frame instead of being assembled with the combined pole plate in the flow frame.

The relation between the efficiency of a battery pack, the real values of correlative parameters of the interior of the battery pack as well as the distribution status thereof and the design of a combined pole plate will be described in details below in combination with the combined pole plate:

(1) first, the combined pole plate is provided thereon with a corresponding measuring port and a monitoring device, and the combined pole plate is assembled into a flow battery pack to get ready for measurement of correlative parameters of an electrolyte in the interior of the flow battery pack;

(2) the efficiencies of different types of battery packs are monitored; when the efficiency of a battery pack is monitored, correlative parameters (e.g. pressure) of the interior of the battery at such efficiency can be measured; whether the structural design of the combined pole plate is reasonable can be determined intuitively according to the monitored efficiency of the battery pack;

(3) when the efficiency of the battery pack is unreasonable, the structural design of a pole plate corresponding to the battery pack is improved;

(4) the improvement (width to depth ratio of flow channels, ratio of the widths to the distances of flow channels and the number of flow channels etc.) on the structural design of the pole plate is determined after analyzing parameters of the interior of the battery pack.

To sum up, various parameters (e.g. pressure) of an electrolyte are directly related with the structural design of a pole plate. The structural design of a pole plate, the distribution status of parameters of the interior of a battery pack and the efficiency of the battery pack are closely related. In a certain structural design, correlative parameters of the electrolyte in the interior of the battery pack present corresponding distribution, and the battery pack also exhibits corresponding efficiency. Different structural designs may be corresponding to different battery pack efficiencies. Generally, the efficiency of a battery pack includes the voltage efficiency, the coulombic efficiency and the energy efficiency. The monitoring provides a reliable basis for optimizing the performance of a battery system.

The above are only preferred embodiments of the present disclosure and should not be used to limit the present disclosure. For those skilled in the art, the present disclosure may have various modifications and changes. Any modifications, equivalent replacements, improvements and the like within the spirit and principle of the present disclosure shall fall within the scope of protection of the present disclosure.

What is claimed is:

1. A flow battery pack with a monitoring system, wherein the flow battery pack comprises:
    a battery pack device, including a pole plate (2), and the pole plate (2) is provided thereon with (i) a measuring port (20) and (ii) a probe installation part (24) connected correspondingly with the measuring port (20); and
    a monitoring device including a measuring probe (23); the measuring probe (23) extends to the interior of the battery pack device and is arranged corresponding to the measuring port (20) on the pole plate (2); the measuring probe (23) is installed at the inner side of the probe installation part (24) and the top end of the measuring probe (23) is adapted to the measuring port (20); the monitoring device is used for monitoring the flow pressure and temperature at the measuring port (20);
    the measuring probe (23) comprising:
    a probe piece (231) installed at an inner side of the probe installation part (24);
    a connecting part (232) connected with one side of the probe piece (231) away from the measuring port (20) and connected with screw threads (25) of the inner wall of the probe installation part (24).

2. The flow battery pack according to claim 1, wherein the pole plate (2) is composed of pole plate pieces, wherein the pole plate pieces comprise:
    a groove pole plate piece (21), and the groove pole plate piece (21) is provided thereon with a groove part (211), and the measuring port (20) is provided on the bottom wall of the groove part (211); and
    a lug boss pole plate piece (22) adaptively connected with the groove pole plate piece (21).

3. The flow battery pack according to claim 2, wherein
    the groove pole plate piece (21) comprises a long straight groove pole plate piece, a right angle groove pole plate piece, a T-type groove pole plate piece, and a crossed groove pole plate piece; and
    the lug boss pole plate piece (22) comprises a long straight lug boss pole plate piece, a right angle lug boss pole plate piece, a T-type lug boss pole plate piece and a crossed lug boss pole plate piece.

4. The flow battery pack according to claim 2, wherein the junction of neighboring pole plate pieces is provided with a sealing part.

5. The flow battery pack according to claim 4, wherein the sealing part comprises:
    a group of sealing grooves (4), correspondingly provided on neighboring pole plate pieces; and
    a sealing piece installed in the interior of the group of sealing grooves (4).

6. The flow battery pack according to claim 4, wherein the junction of neighboring pole plate pieces is provided with a fixing device; the fixing device comprises a locating groove (5) and a locating pin (6); the locating groove (5) and the locating pin (6) are correspondingly provided on neighboring pole plate pieces, and the structures of locating groove (5) and a locating pin (6) are adapted to each other.

7. The flow battery pack according to claim 6, wherein the fixing device comprises a locating plate; the locating plate is provided at one side of the pole plate (2) formed by assembling the pole plate pieces, thus fixing each pole plate piece; and the locating plate is provided thereon with a through hole corresponding to the measuring port (20).

8. The flow battery pack according to claim 7, wherein the locating plate is a grid mesh-shaped locating plate (7).

9. A flow battery pack with a monitoring system, wherein the flow battery pack comprises:
    a battery pack device, including a pole plate (2), and the pole plate (2) is provided thereon with a measuring port (20); and
    a monitoring device including a measuring probe (23); the measuring probe (23) extends to the interior of the battery pack device and is arranged corresponding to the measuring port (20) on the pole plate (2); the monitoring device is used for monitoring the flow pressure and temperature at the measuring port (20),
    wherein the pole plate (2) is composed of pole plate pieces, and wherein the pole plate pieces comprise:
    a groove pole plate piece (21), and the groove pole plate piece (21) is provided thereon with a groove part (211), and the measuring port (20) is provided on the bottom wall of the groove part (211); and
    a lug boss pole plate piece (22) adaptively connected with the groove pole plate piece (21).

10. The flow battery pack according to claim 9, wherein the pole plate (2) is provided thereon with a probe installation part (24); the probe installation part (24) is connected correspondingly with the measuring port (20); the measuring probe (23) is installed at the inner side of the probe installation part (24) and the top end of the measuring probe (23) is adapted to the measuring port (20).

11. The flow battery pack according to claim 9, wherein the measuring probe (23) comprises:
    a probe piece (231) installed at the inner side of the probe installation part (24); and
    a connecting part (232) connected with one side of the probe piece (231) away from the measuring port (20) and connected with screw threads (25) of the inner wall of the probe installation part (24).

12. The flow battery pack according to claim 9, wherein
    the groove pole plate piece (21) comprises a long straight groove pole plate piece, a right angle groove pole plate piece, a T-type groove pole plate piece, and a crossed groove pole plate piece; and
    the lug boss pole plate piece (22) comprises a long straight lug boss pole plate piece, a right angle lug boss pole plate piece, a T-type lug boss pole plate piece and a crossed lug boss pole plate piece.

13. The flow battery pack according to claim 9, wherein the junction of neighboring pole plate pieces is provided with a sealing part.

14. The flow battery pack according to claim 13, wherein the sealing part comprises:
    a group of sealing grooves (4), correspondingly provided on neighboring pole plate pieces; and
    a sealing piece installed in the interior of the group of sealing grooves (4).

15. The flow battery pack according to claim 13, wherein the junction of neighboring pole plate pieces is provided with a fixing device; the fixing device comprises a locating groove (5) and a locating pin (6); the locating groove (5) and the locating pin (6) are correspondingly provided on neighboring pole plate pieces, and the structures of locating groove (5) and a locating pin (6) are adapted to each other.

16. The flow battery pack according to claim 15, wherein the fixing device comprises a locating plate; the locating plate is provided at one side of the pole plate (2) formed by assembling the pole plate pieces, thus fixing each pole plate piece; and the locating plate is provided thereon with a through hole corresponding to the measuring port (20).

17. The flow battery pack according to claim 16, wherein the locating plate is a grid mesh-shaped locating plate (7).

* * * * *